US012614070B2

(12) United States Patent
Li et al.

(10) Patent No.: US 12,614,070 B2
(45) Date of Patent: Apr. 28, 2026

(54) OBJECT RE-IDENTIFICATION USING POSE PART BASED MODELS

(71) Applicant: Intel Corporation, Santa Clara, CA (US)

(72) Inventors: Jianguo Li, Beijing (CN); Shuyuan Li, Shanghai (CN); Hanlin Tang, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 17/764,093

(22) PCT Filed: Dec. 6, 2019

(86) PCT No.: PCT/CN2019/123625
§ 371 (c)(1),
(2) Date: Mar. 25, 2022

(87) PCT Pub. No.: WO2021/109118
PCT Pub. Date: Jun. 10, 2021

(65) Prior Publication Data
US 2022/0343639 A1    Oct. 27, 2022

(51) Int. Cl.
*G06V 10/44*        (2022.01)
*G06N 3/08*         (2023.01)
(Continued)

(52) U.S. Cl.
CPC ................. *G06N 3/08* (2013.01); *G06T 7/74* (2017.01); *G06V 10/454* (2022.01);
(Continued)

(58) Field of Classification Search
CPC . G06N 3/08; G06N 3/045; G06T 7/74; G06T 2207/20081; G06T 2207/20084;
(Continued)

(56) References Cited

U.S. PATENT DOCUMENTS 8,615,105 B1  12/2013  Cheng et al.
9,916,508 B2   3/2018  Pillai et al.
(Continued)

FOREIGN PATENT DOCUMENTS

CN        108108674        6/2018
CN        108629801 A      10/2018
(Continued)

OTHER PUBLICATIONS

Fu, Xinchuan, et al. "Delving deep into multiscale pedestrian detection via single scale feature maps." Sensors 18.4 (2018): 1063. https://www.mdpi.com/1424-8220/18/4/1063 (Year: 2018).*
(Continued)

*Primary Examiner* — John Villecco
*Assistant Examiner* — Han Hoang
(74) *Attorney, Agent, or Firm* — Hanley, Flight & Zimmerman, LLC

(57)                ABSTRACT
An example apparatus for re-identifying objects includes an image receiver to receive a first image and a second image of an object with an identity. The apparatus also includes a fused model generator to fuse a global representation of the object with local representations of pose parts of the object to generate a fused representation of the object based on the first image. The apparatus further includes an object re-identifier to re-identify the object with the identity in the second image based on the fused representation.

22 Claims, 7 Drawing Sheets

(51) Int. Cl.

| | | |
|---|---|---|
| *G06T 7/73* | (2017.01) | |
| *G06V 10/77* | (2022.01) | |
| *G06V 10/776* | (2022.01) | |
| *G06V 10/80* | (2022.01) | |
| *G06V 10/82* | (2022.01) | |
| *G06V 20/52* | (2022.01) | |

(52) U.S. Cl.

CPC ........ *G06V 10/7715* (2022.01); *G06V 10/776* (2022.01); *G06V 10/806* (2022.01); *G06V 10/82* (2022.01); *G06V 20/53* (2022.01); *G06T 2207/20081* (2013.01); *G06T 2207/20084* (2013.01); *G06T 2207/30196* (2013.01); *G06V 2201/07* (2022.01)

(58) Field of Classification Search

CPC ........ G06T 2207/30196; G06V 10/454; G06V 10/7715; G06V 10/776; G06V 10/806; G06V 10/82; G06V 20/53; G06V 2201/07; G06F 18/253

See application file for complete search history.

(56) References Cited

U.S. PATENT DOCUMENTS

| | | | | |
|---|---|---|---|---|
| 9,948,902 | B1 * | 4/2018 | Trundle | G06V 20/52 |
| 10,176,405 | B1 | 1/2019 | Zhou et al. | |
| 10,304,191 | B1 | 5/2019 | Mousavian et al. | |
| 10,321,728 | B1 | 6/2019 | Koh | |
| 10,332,264 | B2 | 6/2019 | Schulter et al. | |
| 10,402,983 | B2 | 9/2019 | Schulter et al. | |
| 10,430,966 | B2 | 10/2019 | Varadarajan et al. | |
| 10,733,441 | B2 | 8/2020 | Mousavian et al. | |
| 10,839,543 | B2 | 11/2020 | Cheng | |
| 10,853,970 | B1 | 12/2020 | Akbas et al. | |
| 11,715,213 | B2 | 8/2023 | Leung et al. | |
| 12,095,973 | B2 | 9/2024 | Bylicka et al. | |
| 2013/0322720 | A1 * | 12/2013 | Hu | G06T 7/75 382/131 |
| 2015/0095360 | A1 | 4/2015 | Vrcelj et al. | |
| 2016/0267331 | A1 | 9/2016 | Pillai et al. | |
| 2017/0316578 | A1 | 11/2017 | Fua | |
| 2018/0130215 | A1 | 5/2018 | Schulter et al. | |
| 2018/0130216 | A1 | 5/2018 | Schulter et al. | |
| 2018/0173969 | A1 | 6/2018 | Pillai et al. | |
| 2018/0293445 | A1 | 10/2018 | Gao | |
| 2018/0350105 | A1 | 12/2018 | Taylor | |
| 2019/0026917 | A1 * | 1/2019 | Liao | G06V 10/82 |
| 2019/0066326 | A1 | 2/2019 | Tran et al. | |
| 2019/0171909 | A1 | 6/2019 | Mandal et al. | |
| 2019/0220992 | A1 * | 7/2019 | Li | G06T 7/60 |
| 2019/0278983 | A1 | 9/2019 | Iqbal et al. | |
| 2019/0340432 | A1 | 11/2019 | Mousavian et al. | |
| 2019/0371080 | A1 | 12/2019 | Sminchisescu | |
| 2020/0058137 | A1 | 2/2020 | Pujades | |
| 2020/0074678 | A1 | 3/2020 | Ning et al. | |
| 2020/0082180 | A1 | 3/2020 | Wang | |
| 2020/0126297 | A1 | 4/2020 | Tian | |
| 2020/0160102 | A1 | 5/2020 | Bruna et al. | |
| 2020/0193628 | A1 | 6/2020 | Chakraborty | |
| 2020/0327418 | A1 | 10/2020 | Lyons | |
| 2020/0364454 | A1 | 11/2020 | Mousavian et al. | |
| 2020/0372246 | A1 | 11/2020 | Chidananda | |
| 2020/0401793 | A1 | 12/2020 | Leung et al. | |
| 2021/0000404 | A1 | 1/2021 | Wang | |
| 2021/0042520 | A1 | 2/2021 | Molin | |
| 2021/0097718 | A1 | 4/2021 | Fisch | |
| 2021/0097759 | A1 | 4/2021 | Agrawal | |
| 2021/0112238 | A1 | 4/2021 | Bylicka et al. | |
| 2021/0117648 | A1 * | 4/2021 | Yang | G06V 20/647 |
| 2021/0192783 | A1 | 6/2021 | Huelsdunk | |
| 2021/0209797 | A1 | 7/2021 | Lee | |
| 2021/0350555 | A1 | 11/2021 | Fischetti | |
| 2021/0366146 | A1 | 11/2021 | Khamis et al. | |
| 2022/0172429 | A1 | 6/2022 | Tong | |
| 2022/0343639 | A1 | 10/2022 | Li et al. | |
| 2022/0351535 | A1 | 11/2022 | Tao et al. | |
| 2023/0186567 | A1 | 6/2023 | Koh | |
| 2023/0298204 | A1 | 9/2023 | Wang | |

FOREIGN PATENT DOCUMENTS

| | | |
|---|---|---|
| CN | 108830139 A | 11/2018 |
| CN | 108960036 A | 12/2018 |
| CN | 108986197 A | 12/2018 |
| CN | 109886090 A | 6/2019 |
| CN | 109948587 A | 6/2019 |
| CN | 110008913 | 7/2019 |
| CN | 110009722 A | 7/2019 |
| CN | 110458940 A | 11/2019 |
| CN | 110516670 A | 11/2019 |
| KR | 20190087258 A | 7/2019 |
| WO | 2019025729 A1 | 2/2019 |
| WO | 2021109118 A1 | 6/2021 |
| WO | 2021120157 A1 | 6/2021 |
| WO | 2021258386 A1 | 12/2021 |

OTHER PUBLICATIONS

Chen, Dapeng, et al. "Video Person Re-identification with Competitive Snippet-Similarity Aggregation and Co-attentive Snippet Embedding." 2018 IEEE/CVF Conference on Computer Vision and Pattern Recognition. IEEE, 2018.https://ieeexplore.ieee.org/abstract/document/8578226 (Year: 2018).*

International Searching Authority, "Search Report," issued in connection with International Patent Application No. PCT/CN2019/123625, mailed on Sep. 9, 2020, 4 pages.

International Searching Authority, "Written opinion," issued in connection with International Patent Application No. PCT/CN2019/123625, mailed on Sep. 9, 2020, 5 pages.

Zajdel et al., "Keeping Track of Humans: Have I Seen This Person Before?" ResearchGate, May 2005, 7 pages.

Delannay et al., "Detection and Recognition of Sports(wo)men from Multiple Views," IEEE International Conference on Distributed Smart Cameras, Aug. 30-Sep. 2, 2009, 7 pages.

Felzenszwalb et al. "Object Detection with Discriminatively Trained Part Based Models," IEEE Trans on PAMI 2010, 20 pages.

Andriluka et al., "2D Human Pose Estimation: New Benchmark and State of the Art Analysis," Computer Vision Foundation, 2014, 8 pages.

Zhang et al., "Part-based R-CNNs for Fine-grained Category Detection," arXiv:1407.3867v1 [cs.CV], Jul. 15, 2014, 16 pages.

Zheng et al., "Scalable Person Re-identification: A Benchmark," Computer Vision Foundation, 2015, 9 pages.

Schroff et al., "FaceNet: A unified Embedding for Face Recognition and Clustering," arXiv: 1503.03832v3 [cs.cv], Jun. 17, 2015, 10 pages.

Joo et al., "Panoptic Studio: A Massively Multiview System for Social Interaction Capture," Dec. 9, 2016, Retrieved from the Internet: <https://arxiv.org/abs/1612.03153> 14 pages.

Pavlakos et al., "Harvesting Multiple Views for Marker-less 3D Human Pose Annotations," Apr. 16, 2017, Retrieved from the Internet: <https://arxiv.org/abs/1704.04793> 10 pages.

Zhong et al., "Random Erasing Data Augmentation," arXiv:1708.04896v2 [cs.CV], Nov. 16, 2017, 10 pages.

Hermans et al., "In Defense of the Triplet Loss for Person Re-Identification," arXiv:1703.07737v4 [cs.CV], Nov. 21, 2017, 17 pages.

Hu et al., "Squeeze-and-Excitation Networks," Computer Vision Foundation, 2018, 10 pages.

Sun et al., "Beyond Part Models: Person Retrieval with Refined Part Pooling (and A Strong Convolutional Baseline)," arXiv:1711.09349v3 [cs.cv], Jan. 9, 2018, 10 pages.

Zhang et al., "AlignedReID: Surpassing Human-Level Performance in Person Re-Identification," arXiv.1711.08184v2 [cs.CV], Jan. 31, 2018, 10 pages.

(56) References Cited

OTHER PUBLICATIONS

Rhodin et al., "Learning Monocular 3D Human Pose Estimation from Multi-view Images," Mar. 24, 2018, Retrieved from the Internet: <https://arxiv.org/abs/1803.04775>, 10 pages.

Zhong, Z. et al., "Camera Style Adaptation for Person Re-identification", CVPR (2018), pp. 5157-5166.

Wang et al., "Person Re-identification with Cascaded Pairwise Convolutions," Jun. 18-23, 2018, IEEE/CVF Conference on Computer Vision and Pattern Recognition, Retrieved from the Internet: <https://ieeexplore.ieee.org/document/8578257>, 9 pages.

Ionescu et al., "Human3.6M Dataset," Retrieved from the Internet: http://vision.imar.ro/human3.6m/description.php, 1 page.

Wang et al., "Learning Discriminative Features with Multiple Granularities for Person Re-Identification," arXiv:1804.01438v3 [cs.CV], Aug. 17, 2018, 9 pages.

Wojke et al., "Deep Cosine Metric Learning for Person Re-Identification," arXiv:1812.00442v1 [cs.CV], Dec. 2, 2018, 9 pages.

Intel, "2019 CES: Intel and Alibaba Team on New AI-Powered 3D Athlete Tracking Technology Aimed at the Olympic Games Tokyo 2020," Retrieved from the Internet: [https://newsroom.intel.com/news/intel-alibaba-team-ai-powered-3dathlete-trackingtechnology-olympic-games-tokyo-2020/#gs-xy8m7c], Jan. 7, 2019, 3 pages.

Schwarcz et al., "3D Human Pose Estimation from Deep Multi-View 2D Pose," Feb. 7, 2019, Retrieved from the Internet: <https://arXiv:1902.02841v1> 6 pages.

Sun et al., "Deep High-Resolution Representation Learning for Human pose Estimation," arXiv:1902.09212v1 [cs.CV], Feb. 25, 2019, 12 pages.

Luo et al., Bag of Tricks and a Strong Baseline for Deep Person Re-identification, arXiv: 1903.070710 [cs.cv], Apr. 19, 2019, 9 pages.

Iskakov et al., "Learnable Triangulation of Human Pose," May 14, 2019, Retrieved from the Internet: <https://arXiv:1905.05754v1> 9 pages.

Dong, J. et al., "Fast and robust multi-person 3D pose estimation from multiple views", Proceedings of the IEEE Conference on Computer Vision and Pattern Recognition; pp. 7792-7801, 2019.

Arbues-Sanguesa et al., "Multi-Person tracking by multi-scale detection in Basketball scenarios," arXiv:1907.04637v1, Jul. 10, 2019, 8 pages.

Chen et al., "Spatial-Temporal Attention-Aware Learning for Video-Based Person Re-Identification," IEEE Transactions on Image Processing, vol. 28, Issue 9, Sep. 2019, 14 pages.

Min Xin et al., "Motion Capture Research: 3D Human Pose Recovery Based on RGB Video Sequences," Applied Sciences, vol. 9, No. 17, Sep. 2, 2019, pp. 1-22, XP55885594, DOI:10.3390/app9173613, 22 pages.

Qiu et al., "Cross View Fusion for 3D Human Pose Estimation," Sep. 3, 2019, Retrieved from the Internet: <https://arxiv.org/abs/1909.01203> 10 pages.

International Searching Authority, "Written Opinion of the International Searching Authority," issued in connection with International Patent Application No. PCT/CN2019/126906, mailed on Sep. 23, 2020, 3 pages.

International Searching Authority, "International Search Report," issued in connection with International Patent Application No. PCT/CN2019/126906, mailed on Sep. 23, 2020, 3 pages.

International Searching Authority, "International Search Report," issued in connection with International Patent Application No. PCT/CN2020/098306, mailed on Mar. 25, 2021, 5 pages.

International Searching Authority, "Written Opinion of the International Searching Authority," issued in connection with International Patent Application No. PCT/CN2020/098306, mailed on Mar. 25, 2021, 4 pages.

International Searching Authority, "Written Opinion of the International Searching Authority," issued in connection with International Patent Application No. PCT/US2021/050609, mailed on Dec. 28, 2021, 5 pages.

International Searching Authority, "International Search Report," issued in connection with International Patent Application No. PCT/US2021/050609, mailed on Dec. 28, 2021, 5 pages.

International Searching Authority, "International Preliminary Report on Patentability," issued in connection with International Patent Application No. PCT/CN2019/123625, mailed on Jun. 16, 2022, 6 pages.

International Searching Authority, "International Preliminary Report on Patentability," issued in connection with International Patent Application No. PCT/CN2019/126906, mailed on Jun. 30, 2022, 5 pages.

United States Patent and Trademark Office, "Non-Final Office Action," issued in connection with U.S. Appl. No. 16/914,232, dated Jul. 21, 2022, 13 pages.

United States Patent and Trademark Office, "Notice of Allowance and Fee(s) Due," issued in connection with U.S. Appl. No. 16/914,232, dated Nov. 30, 2022, 9 pages.

International Bureau, "International Preliminary Report on Patentability," issued in connection with International Appl. No. PCT/CN2020/098306, dated Dec. 13, 2022, 5 pages.

United States Patent and Trademark Office, "Non-Final Office Action," issued in connection with U.S. Appl. No. 18/000,389, dated Jul. 1, 2024, 18 pages.

Intel, "Intel True View," https://www.intel.com/content/www/us/en/sports/technology/true-view.html, last accessed Feb. 24, 2023.

United States Patent and Trademark Office, "Notice of Allowance and Fee(s) Due," issued in connection with U.S. Appl. No. 16/914,232, dated Mar. 15, 2023, 8 pages.

International Searching Authority, "International Preliminary Report on Patentability," issued in connection with International Patent Application No. PCT/US2021/050609, mailed on Jul. 6, 2023, 7 pages.

United States Patent and Trademark Office, "Non-Final Office Action," issued in connection with U.S. Appl. No. 17/131,433, dated Feb. 15, 2024, 11 pages.

European Patent Office, "Extended European Search Report," issued in connection with European patent Application No. 20941827.6, dated Feb. 29, 2024, 9 pages.

United States Patent and Trademark Office, "Notice of Allowance and Fee(s) Due," issued in connection with U.S. Appl. No. 17/131,433, dated May 16, 2024, 6 pages.

United States Patent and Trademark Office, "Non-Final Office Action," issued in connection with U.S. Appl. No. 17/764,100, dated Jun. 12, 2024, 10 pages.

United States Patent and Trademark Office, "Final Office Action," issued in connection with U.S. Appl. No. 18/000,389, dated Oct. 18, 2024, 11 pages.

United States Patent and Trademark Office, "Notice of Allowance and Fee(s) Due," issued in connection with U.S. Appl. No. 17/764,100, dated Jan. 13, 2025, 9 pages.

United States Patent and Trademark Office, "Notice of Allowance and Fee(s) Due," issued in connection with U.S. Appl. No. 18/000,389, dated Jan. 15, 2025, 10 pages.

European Patent Office, "Extended European Search Report," issued in connection with European Patent Application No. 251179962.3, dated Aug. 26, 2025, 10 pages.

* cited by examiner

<u>100</u>

300

400

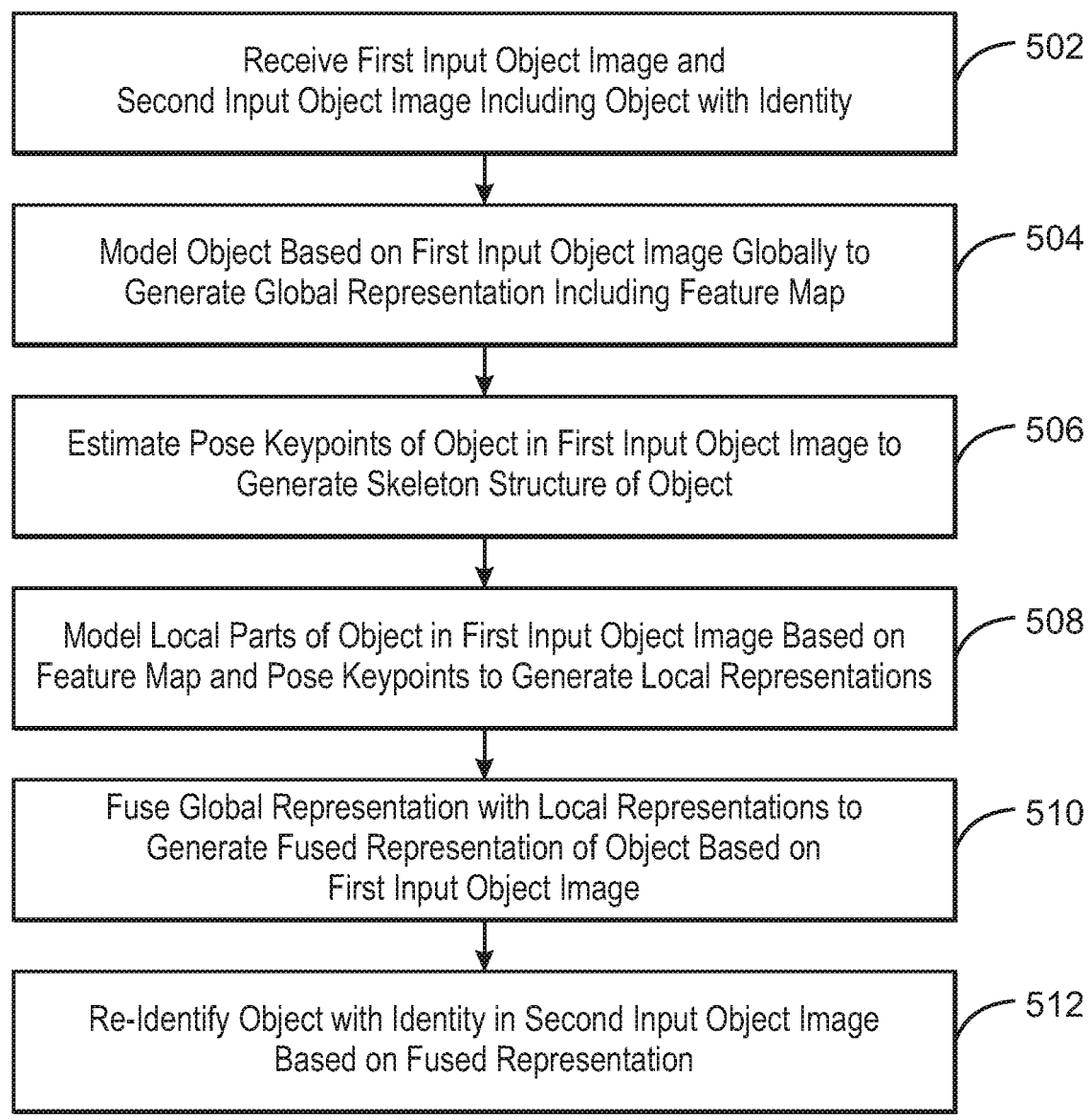

Receive First Input Object Image and
Second Input Object Image Including Object with Identity — 502

Model Object Based on First Input Object Image Globally to
Generate Global Representation Including Feature Map — 504

Estimate Pose Keypoints of Object in First Input Object Image to
Generate Skeleton Structure of Object — 506

Model Local Parts of Object in First Input Object Image Based on
Feature Map and Pose Keypoints to Generate Local Representations — 508

Fuse Global Representation with Local Representations to
Generate Fused Representation of Object Based on
First Input Object Image — 510

Re-Identify Object with Identity in Second Input Object Image
Based on Fused Representation — 512

Processor

704

Image Receiver
Module
706

Global Object
Modeler Module
708

Keypoint Pose
Estimator Module
710

Local Object
Modeler Module
712

Fused Model
Generator Module
714

Object Re-Identifier
Module
716

OBJECT RE-IDENTIFICATION USING POSE PART BASED MODELS

RELATED APPLICATION

This patent arises under 35 U.S.C. § 371 from a U.S. National Stage of International Patent Application No. PCT/CN2019/123625, which was filed on Dec. 6, 2019. International Patent Application No. PCT/CN2019/123625 is hereby incorporated herein by reference in its entirety. Priority to International Patent Application No. PCT/CN2019/123625 is hereby claimed.

BACKGROUND

Re-identification (Re-ID) can be used to re-identify specific instances of objects across multiple cameras to support multi-camera object tracking, among other purposes. For example, the tracked objects may be people, vehicles, or animals, among other types of objects.

BRIEF DESCRIPTION OF THE DRAWINGS

FIG. 5 is a flow chart illustrating an example method for re-identifying objects using pose part based models;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
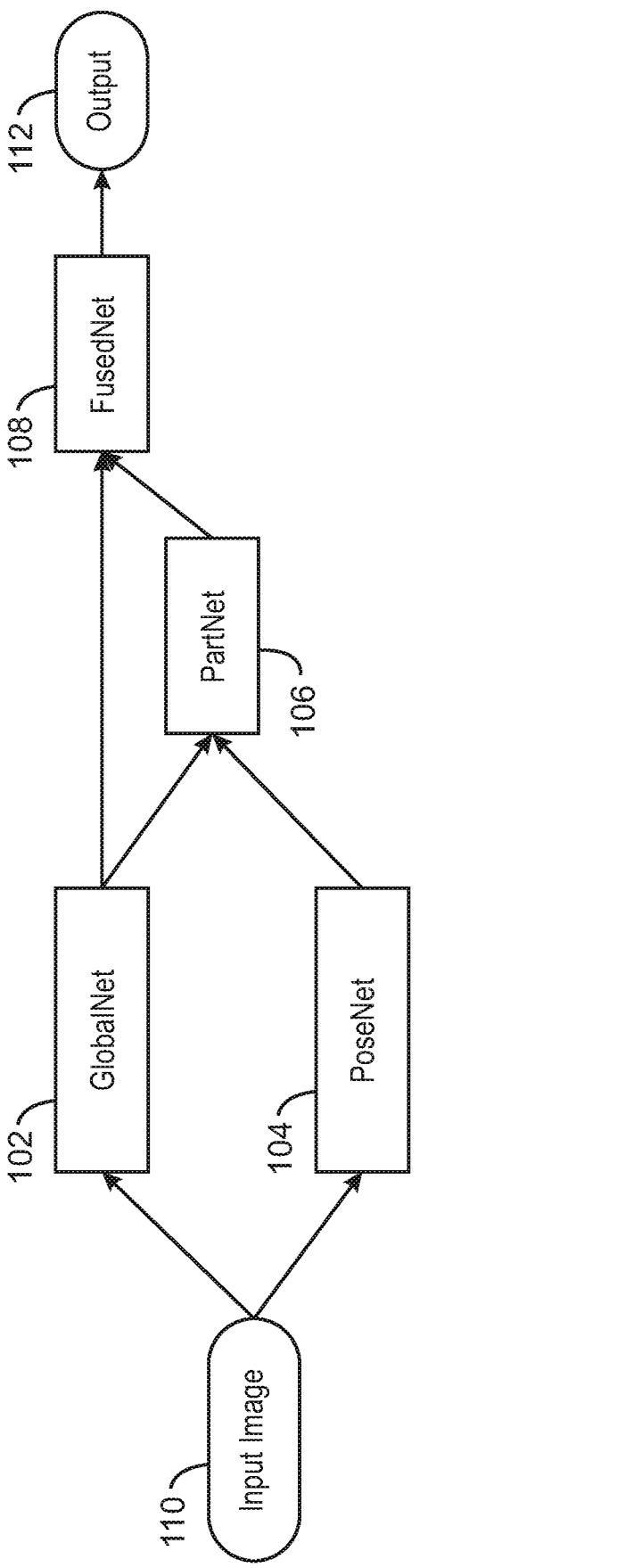
FIG. 1 is a block diagram illustrating an example system for re-identifying objects using pose part based models.

Re-identification (Re-ID) may be used to re-identify people or other object targets across multi-camera systems to support multi-camera object tracking. For example, multi-camera object tracking may involve continuously detecting an object across frames from multiple cameras. Re-ID may also be used for many surveillance related applications such as person Re-ID, vehicle Re-ID, animal re-ID, etc. For example, a person may be imaged at one location and then imaged from another angle or location by another camera. Re-ID may be used to detect that the person in the second image is the same person as in the first image. However, traditional holistic appearance based re-ID models cannot capture large pose variations of objects due to clutter background introduced by non-rigid pose motions. As used herein, clutter background refers to anything in the image that is not a target object, but may mix with the boundary of target object. For example, clutter background may be grass, trees, flowers, buildings, etc. A pose variation refers to non-rigid pose change of target objects that may result in a different size of bounding box to cover all parts of the target object. For example, a human may have a standing pose, sitting pose, running pose, etc. In this example, the two different poses of a standing human pose versus a running human pose may have different bounding boxes to include all parts of human body. Moreover, using a classification loss may not separate the margin between positive pairs and negative pairs of images. As the classification network requires that each category contains sufficient examples, this may be not true for a re-ID dataset, so that the classification loss based re-ID network may not be well trained. In addition, some methods such as triplet based methods do not take local part information into consideration, which may be used for non-rigid large pose variation re-ID tasks. For example, images of humans with large pose variations will introduce large amount of background information if just using a bounding box, while fine-scale local part based modeling may produce much accurate representation capability. Furthermore, in aligned re-ID methods based on local grid modeling, each grid has the same size, and the same contribution. Aligned re-ID only computes the best match among two image pairs. The background clutter information introduced by large pose variations may therefore not be handled well by aligned re-ID methods.

Part-based models may be used to model local deformable object structures for object detection and fine-grain object recognition. However, this kind of modeling has two major limitations. First, the structure modeling is very coarse and without global target structures like a human skeleton. Second, the structure learning is relatively complicated and therefore may not be easily integrated into deep neural networks.

The present disclosure relates generally to techniques for re-identifying objects in images. For example, a target object identified as having a particular identity in a first image may be re-identified in a second image. Specifically, the techniques described herein include an apparatus, method and system for re-identifying objects having the same identity in images using pose part based models. An identity, as used herein, refers to attributes of a particular instance of an object, such as a particular individual, animal, vehicle, or other specific object. An example apparatus includes an image receiver to receive a first image and a second image of an object with an identity. The apparatus also includes a fused model generator to fuse a global representation of the identity with local representations of pose parts of the identity to generate a fused representation of the identity based on the first image. As used herein, pose part refer to parts in skeleton based on object models. For example, if a human is the target object, the body, arms, legs, and head of the human may be different pose parts according to the skeleton model of the human. The apparatus further includes an object re-identifier to re-identify the identity in the second image using the fused representation.

In various examples, the techniques leverage accurate keypoint pose estimation to realize precise object part modeling, resulting in a method that uses a pose part based model (PPbM) for object re-identification. In particular, the techniques may be used to seamlessly integrate pose estimation results into part-based models for large-pose variation object modeling to realize accurate object re-ID. The techniques described herein thus enable resolution of issues rising in large pose variations for re-identification. In addition, the posed part based model (PPbM) can reduce the negative impact from clutter background introduced by large pose variations for deformable objects, and thus greatly improve the re-ID accuracy and robustness. In some examples, PPbM can be implemented as an integrated solution, which can be trained in an end-to-end manner such that it can be optimized with better accuracy and efficiency. After training, the integrated PPbM may also be more accurate and efficient at inference time when making predictions using the trained PPbM. For example, the integrated PPbM may be able to more accurately and quickly re-identify objects in additional received images. In this manner, the techniques may be used to overcome color, lighting, and pose differences, among other difficulties, when re-identifying an object in a subsequent image. Moreover, the techniques herein make precise modeling of non-rigid objects like human and animals, which greatly reduces the impact from clutter background introduced by pose variations, and thus yields much better accuracy during re-ID.

FIG. 1 is a block diagram illustrating an example system for re-identifying objects using pose part based models. The example system 100 can be implemented in the computing device 600 in FIG. 6 using the method 500 of FIG. 5. In some examples, the system 100 can be implemented as the system 200 of FIG. 2.

The example system 100 includes a GlobalNet 102. For example, the GlobalNet may be a certain kind of deep neural network. The system 100 also includes a PoseNet 104. For example, the PoseNet 104 may be a certain kind of deep neural network. The system 100 also further includes a PartNet 106 that is communicatively coupled to both the GlobalNet 102 and the PoseNet 104. For example, the PartNet 106 may be a certain kind of deep neural network. The system also further includes a FusedNet 108 communicatively coupled to both the GlobalNet 102 and the PartNet 106. In some examples, the FusedNet 108 may be another deep neural network. In various examples, the GlobalNet 102, the PoseNet 104, the PartNet 106, and the FusedNet 108 may be a residual neural network (ResNet) such as the deep neural network ResNet-50, any form of VGGNet introduced by Visual Geometry Group in 2014, or any other suitable deep neural network.

Figure 2:
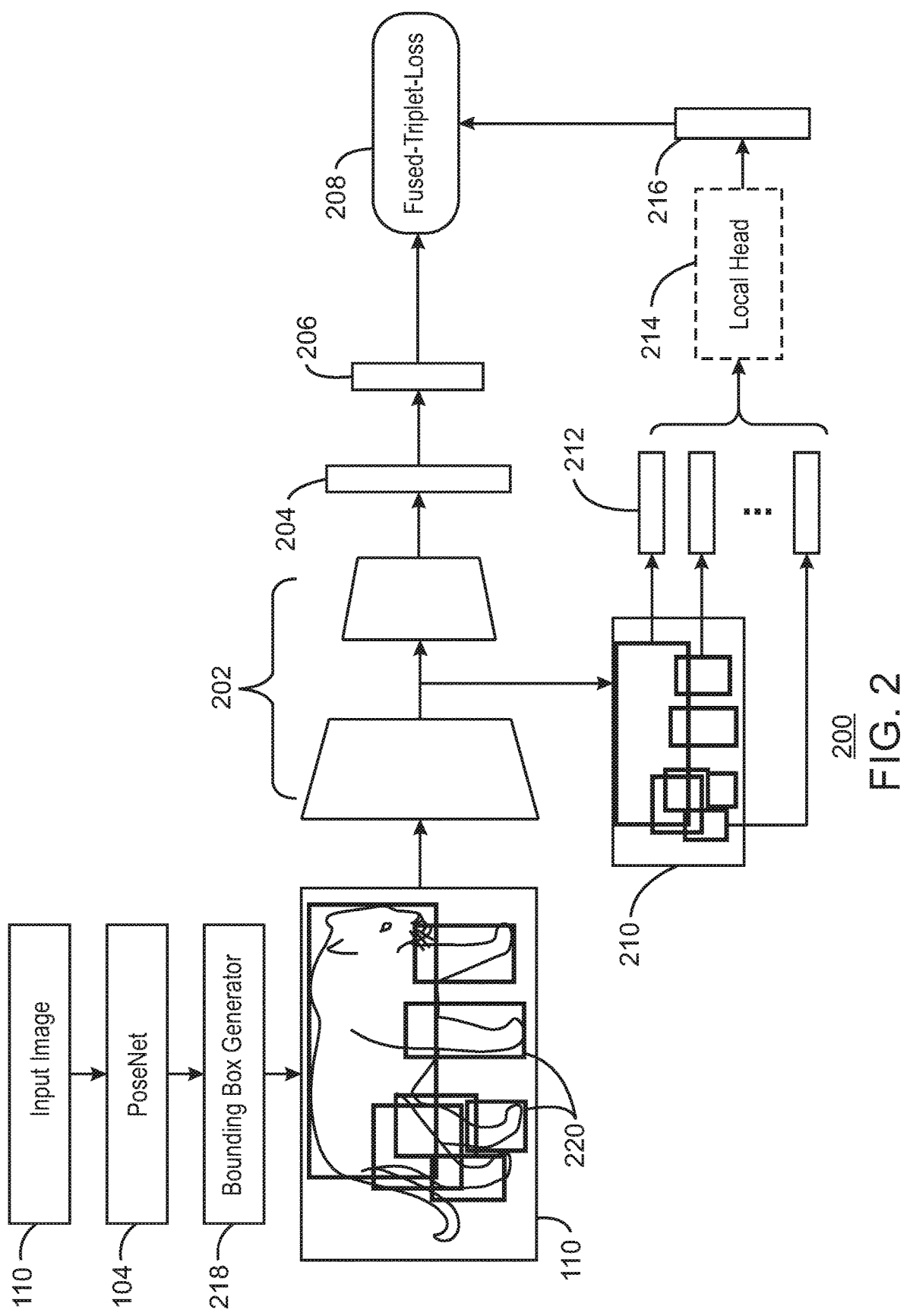
FIG. 2 is a block diagram illustrating another example system for re-identifying objects using pose part based models.

As shown in FIG. 1, the system 100 may be trained to receive an input image 110 and generate an output 112. In various examples, the input image 100 may be a two dimensional image including an object. For example, the object may be person, a vehicle, or an animal, such as a cat as depicted in FIG. 2. In some examples, the output 112 may be a detected particular identity for the object. For example, the particular identity may be a particular, cat, person, or vehicle that was identified in a previous image. In the example of FIG. 1, the GlobalNet 102, the PoseNet 104, the PartNet 106, and the FusedNet 108 may be individually trained to perform their respective functions as described herein. For example, a GlobalNet 102 such as ResNet-50 may be trained with a classification loss. In some examples, the PoseNet 104 may be trained for pose estimation with regression loss from images with pose annotations.

In the example of FIG. 1, the GlobalNet 102 can model input object images globally with one or more convolutional networks. For example, the GlobalNet 102 may be trained to generate feature maps.

In various examples, the PoseNet 104 can estimate the keypoint pose of objects and output the skeleton structures of the objects. In some examples, the skeleton structure of a four-legged animal may include 14 skeleton keypoints in its body and limbs. For example, the head may include three skeleton keypoints, the front limbs may include two keypoints each, the rear limbs may contain three keypoints each, and the body may include two keypoints. In some examples, the one of the two keypoints of the body may be connected to the keypoints of the rear limbs and one of the two keypoints of the body may be connected to the front limbs. Thus, as one example, the output of the PoseNet 104 may be 14 skeleton keypoints with an input image of a four-legged animal.

In various examples, the PartNet 106 makes use of information from both GlobalNet 102 and PoseNet 104 to make a precise local part modeling. For example, the PartNet 106 may receive a feature map from the GlobalNet 102 and set of pose keypoints from the PoseNet 104 and generate a local representation. In some examples, the local representation may be local part features.

The FusedNet 108 can fuse both global representation and local representation as a whole to form a fused representation that can be used to re-identify objects more accurately. For example, the fused representation may be a harmonious and accurate representation of the target object. The fused representation may then be used for a re-ID task. For example, given an input query object image 110, the fused representation may be used to find all the images with the same identity of the query across multiple cameras in the gallery database.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input images, neural networks, outputs, etc.).

FIG. 2 is a block diagram illustrating another example system for re-identifying objects using pose part based models. In particular, the system 200 seamlessly combines and integrates the functionality of blocks 102-108 of the system 100 of FIG. 1. Thus, the system 200 can be trained in an end-to-end manner, such that the functionality of blocks 102-108 of the system 100 of FIG. 1 are trained simultaneously. The example system 200 can be implemented in the computing device 600 in FIG. 6 using the method 500 of FIG. 5.

In various examples, the example system 200 may be a neural network. For example, the system may include a sub-network 202 with convolutional layers that may be a deep neural network such as ResNet-50, or any other suitable convolutional neural network. The system 200 includes fully-connected layers 204 and 206 that are communicatively coupled to the sub-network 202. The system 200 includes a fused-triplet loss 208 communicatively coupled to the convolutional layer 206 including global features. The system 200 also includes a feature map 210 shown being generated by the sub-network 202. The system 200 also further includes a set of local features 212 extracted from the feature map 210. The system 200 includes a local head 214 shown receiving the local features 212. For example, the local head 214 may be the concatenating based local head 300 of FIG. 3 or the soft-attention based local head 400 of FIG. 4. The local head 214 is shown outputting aggregated features to a fully-connected layer 216 including local features. For example, the identity may be particular object identified in an image processed earlier.

In the example of FIG. 2, a four-legged cat is used as an example to show how GlobalNet, PoseNet may be combined in the FusedNet using an integrated PPbM framework. In various examples, given an original input image 110 with target object inside, a PoseNet 104 can generate a pose skeleton estimation for the input image 110. In various examples, a bounding box generator 218 can generate a bounding box 220 or convex hull for each of a number of pre-defined object parts. In various examples, a bounding box is aligned with axis, while a convex hull could be any shape. In some examples, the bounding box 220 or convex hull may be estimated from the skeleton by the axis-aligned bounding box (AABB) algorithm or a convex hull algorithm. For example, the bounding box 220 can be estimated using the Quickhull Algorithm for Convex Hulls, first released in 1995. In various examples, the set of pre-defined body parts may include certain skeleton keypoints, and may include a certain semantic meaning. For example, the skeleton keypoints may include a main body keypoint, part keypoints for four limbs, head keypoints, etc.

As one example, at block 218, the detected 15 pose keypoints of the cat may be divided into seven pose parts. For example, the seven pose parts may include a body truck part, two front leg parts, and four back leg parts. For each part, a convex hull box 220 may have been generated according to the pose skeleton.

In various examples, the sub-network 202 may be any suitable sub-net such as ResNet-50. In some examples, the system 200 can extract the global feature representation from global features 206, and a local feature representation from local features 216 with regional average pooling (RAP) from a predetermined feature map in the sub-network 202 for each part. For example, the feature map used may be a res3d feature map of the ResNet-50 deep neural network. In various examples, most of the backbone network layers of the system 200 may be shared between the global features of the sub-network 202 and the local part-based features of the PartNet.

As one example, the body parts may be represented by the expression $$\{x_i\}_{i=1}^7.$$

A local transformation $f_i(\ )$ may be defined on each $x_i$, and an aggregation function $F_{i=1:7}[f_i(x_i)]$ defined to aggregate features from 7 parts together. For example, the local transformation may be implemented using fully-connected (FC) layers. As used herein, a fully-connected layer connects every neuron in one layer to every neuron in another layer. Thus, in a fully-connected layer, each neuron receives input from every element of the previous layer. In various examples, the local part features may be aggregated using any suitable technique. For example, the local part features may be aggregated using the concatenating function of the concatenating based local head 300 of FIG. 3 or the soft-attention strategy of the soft-attention based local head 400 of FIG. 4.

Then, a global transformation $g(\ )$ may be enforced on the aggregated feature F. For example, the global transformation may be another FC layer. The total pose-part based model may then be defined using the Equation:

$$L_{part}=L_{TH}(g\{F_{i=1:7}[f_i(x_i)]\})  \qquad \text{Eq. 1}$$

where $L_{TH}$ is the triplet hard loss function for training the network. As used herein, a triplet is defined as an anchor sample, a positive sample to the anchor, and a negative sample to the anchor. The triplet loss tries to maximally separate the distance between an anchor instance and positive pair; and the distance between an anchor instance and negative pair. This may greatly improve the re-ID accuracy. In various examples, both the global representation and the pose-part based representation can be trained either with cross-entropy loss or triplet loss for object re-ID purposes. As one example, a combined triplet loss 208 to train the whole network together may be defined using the Equation:

$$L=L_{glb}+\gamma L_{part}  \qquad \text{Eq. 2}$$

where $\gamma$ is a hyper-parameter to control contribution of global and part based representation, with default value $\gamma=1$.

In this manner, the integrated PPbM framework of system 200 combines GlobalNet, pose results of the PoseNet, and the FusedNet together, such that all three can be trained at the same time.

The diagram of FIG. 2 is not intended to indicate that the example system 200 is to include all of the components shown in FIG. 2. Rather, the example system 200 can be implemented using fewer or additional components not illustrated in FIG. 2 (e.g., additional inputs, features, neural networks, local heads, outputs, target objects, losses, etc.).

Figure 3:
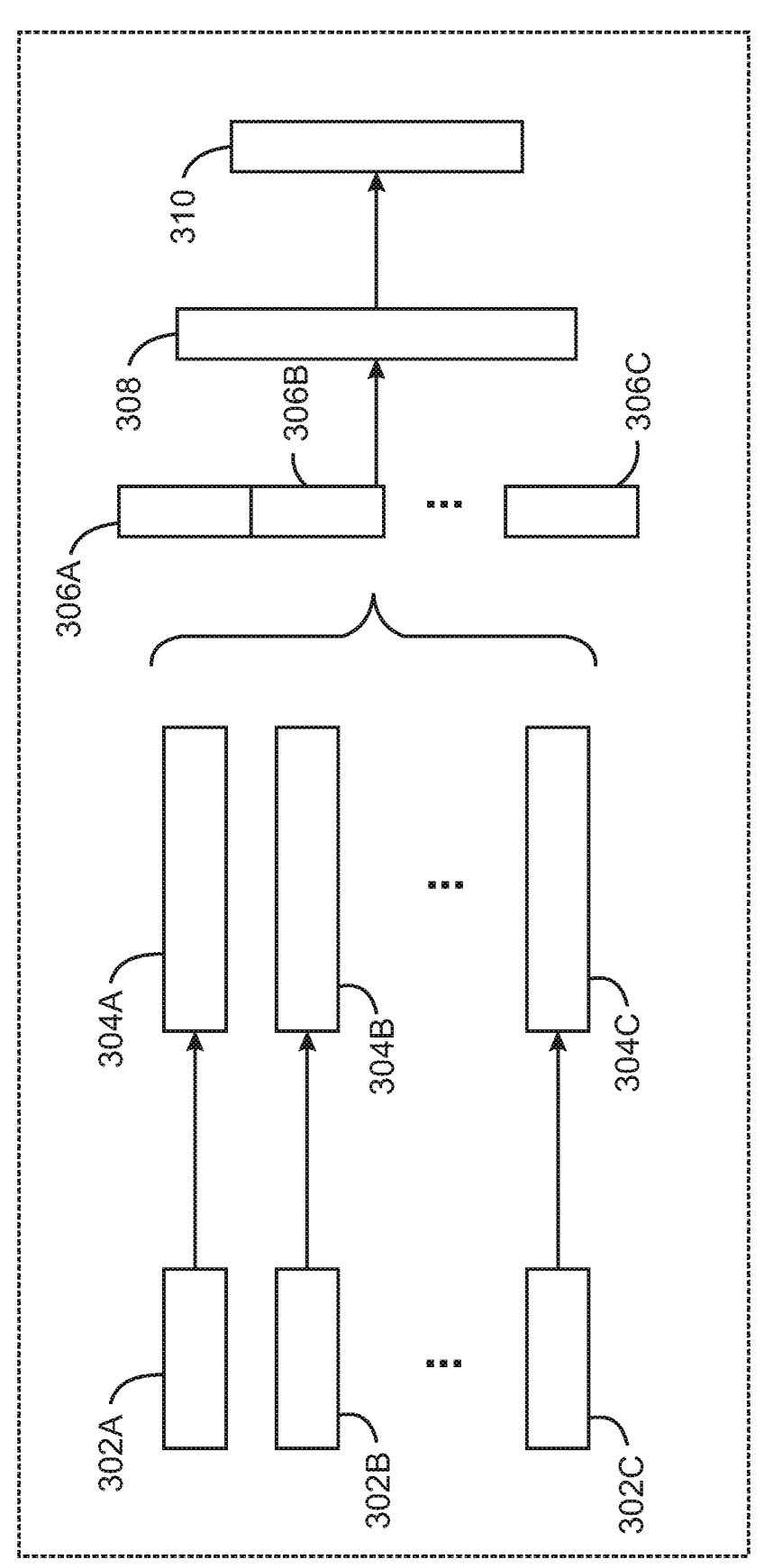
FIG. 3 is a block diagram illustrating an example concatenating based local head for an integrated pose part based model.

FIG. 3 is a block diagram illustrating an example concatenating based local head for an integrated pose part based model. The example concatenating based local head 300 can be implemented in the systems 100 and 200 of FIGS. 1 and 2, the computing device 600 of FIG. 6, or the computer readable media 700 of FIG. 7.

In the example of FIG. 3, the concatenating based local head 300 uses a concatenating function to concatenate features from multiple pose parts together. The example concatenating based local head 300 includes feature vectors 302A-302C. For example, each of the feature vectors 302A, 302B, and 302C may be associated with a particular region of a feature map linked to a particular pose part. In some examples, feature vector 302A may be associated with a region representing a head, feature vector 302B may be associated with a region representing a left arm, and feature vector 302C may be associated with a region representing a torso, etc. In various examples, additional feature vectors may be included based on the number of pose parts for a given target object. For example, a four-legged animal may have a total of seven pose parts. In various examples, the feature vectors 302A, 302B, and 302C may each include 256 dimensions of features generated based on each such region of the feature map.

The concatenating based local head 300 also includes fully-connected layers 304A-304C. For example, the fully-connected layers 304A-304C may generate a number of feature vectors. For example, each fully-connected layer 304A-304C may generate a feature vector with 512 dimensions for each pose part. Thus, in one example, the fully-connected layer may double the number of features for each pose part.

At concatenation units 306A-306C, the feature vectors from fully-connected layers 304A-304C are concatenated. For example, given seven pose parts, the concatenation of seven feature vectors of 512 dimensions may result in a feature matrix with dimensions of 7×512 that is sent to a fully-connected layer 308. The dimensions of the feature matrix are transformed via the fully-connected layer 308 to generate a 1×n vector 310 representing the concatenated loss of n object identities. For example, the object identities may represent particular specific instances of cats, cars, people, etc. As one example, if the training set has 107 object identities, vector 310 will have 107 number of features to represent a softmax score for the resulting concatenated loss. In various examples, any number of object identities may be included in the vector 310, such as 1000 identities in situations with higher numbers of detected instances.

The diagram of FIG. 3 is not intended to indicate that the example concatenating based local head 300 is to include all of the components shown in FIG. 3. Rather, the example concatenating based local head 300 can be implemented using fewer or additional components not illustrated in FIG. 3 (e.g., additional features, layers, etc.).

Figure 4:
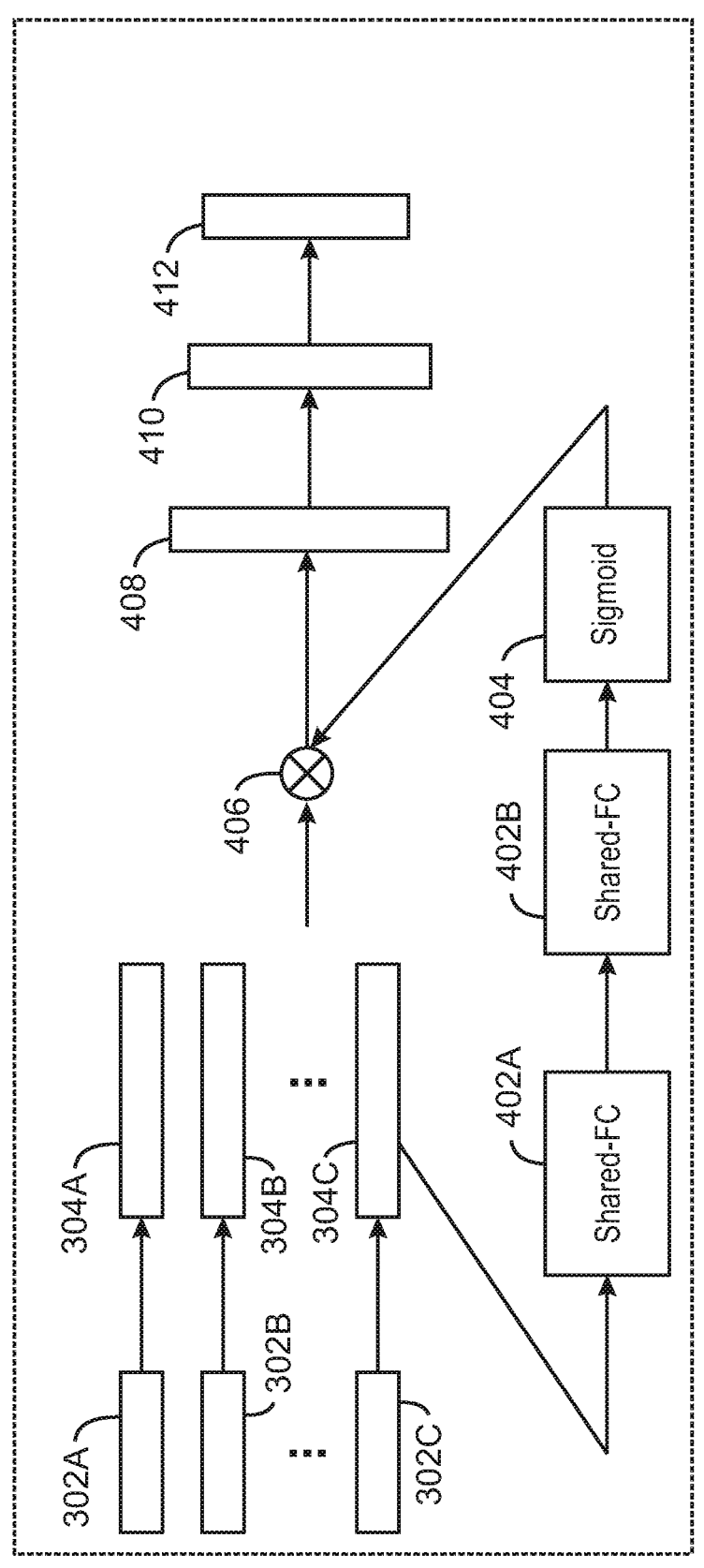
FIG. 4 is a block diagram illustrating an example soft-attention based local head for an integrated pose part based model.

FIG. 4 is a block diagram illustrating an example soft-attention based local head for an integrated pose part based model. The example soft-attention based local head 400 can be implemented in the systems 100 and 200 of FIGS. 1 and 2, the computing device 600 of FIG. 6, or the computer readable media 700 of FIG. 7.

The example soft-attention based local head 400 includes similarly numbered elements of FIG. 3. In addition, the soft-attention based local head 400 includes a pair of shared fully-connected (FC) layers 402A and 402B communicatively coupled to receive the feature vectors from fully-connected layers 304A-304C. The soft-attention based local head 400 further includes a sigmoid unit 404 communicatively coupled to the shared-FC 402B. The soft-attention based local head 400 also includes a multiplier unit 406 communicatively coupled to the sigmoid unit 404 and the feature vectors from fully-connected layers 304A-304C. For example, the multiplier unit 406 may multiply each of the vectors from fully-connected layers 304A-304C by a corresponding soft-attention coefficient from the sigmoid unit 404 to generate a weighted sum vector 408. The soft-attention based local head 400 includes a fully-connected layer 410 to generate an identity loss vector 412 from the weighted sum vector 408.

In the example of FIG. 4, the soft-attention based local head 400 adopts a soft-attention strategy to combine pose parts together. In various examples, the pose parts may be combined together using a weighted summation. For example, the shared-FC 402A may receive an n×512 matrix corresponding to the vectors from the fully-connected layers 304A-304C and output an n×8 matrix, wherein n is the number of pose parts. The shared-FC 402B may receive the n×8 matrix and output an n×1 vector. The n×1 vector may include a set of scalar soft-attention coefficients $\alpha_1 \ldots \alpha_n$ for each of the n feature vectors from fully-connected layers 304A-304C. The sigmoid unit 404 may normalize the $\alpha_i$ values to be between 0 and 1. For example, the soft-attention strategy may be implemented using the Equation:

$$F_{i=1:n}[y_i] = \sum_{i=1}^{n} \alpha_i y_i$$

Eq. 3 where $\gamma_i$ is local transformation result representation for part-i, $\alpha_1$ is the soft-attention coefficient obtained with shared-FC layers 402A and 402B as shown in FIG. 4, and n is the total number of pose parts in a target object. In some examples, the shared-FC layers may be implemented as a Squeeze-Excitation network (SENet). In particular, the FC layers may adaptively recalibrate channel-wise feature responses by explicitly modelling interdependencies between channels.

In various examples, the result of the weighted summation 406 may be a single 512-dimensional vector 408 with soft-attention coefficients applied. Another The diagram of FIG. 4 is not intended to indicate that the example soft-attention based local head 400 is to include all of the components shown in FIG. 4. Rather, the example soft-attention based local head 400 can be implemented using fewer or additional components not illustrated in FIG. 4 (e.g., additional features, layers, functions, etc.).

FIG. 5 is a flow chart illustrating a method for re-identifying objects using pose part based models. The example method 500 can be implemented in the systems 100 and 200 of FIGS. 1 and 2, the computing device 600 of FIG. 6, or the computer readable media 700 of FIG. 7. For example, the method 500 can be implemented using the processor 602 or the processor 702.

At block 502, a processor receives first input object image and a second input object image including an object with an identity. For example, the identity of the object may be attributes of a particular instance of an object, such as a four-legged animal. As one example, the identity may be of a particular cat. In various examples, the first input object image and a second input object image may be captured using different cameras. In some examples, the first input object image and a second input object image may be captured at different times or different locations.

At block 504, the processor globally models the object from the first input object image to generate a global representation including a feature map. In various examples, the feature maps may include bounding boxes enclosing regions of an input object image corresponding to different pose parts of an object. For example, a four-legged animal object may have seven post parts including a body trunk part, two front limbs, and four back leg parts.

At block 506, the processor estimates pose keypoints of the object in the first input object image to generate a skeleton structure of the object. In various examples, the processor can estimate the pose keypoints using a number of pose keypoints based on a category of the object. For example, the skeleton structure of four-legged animals may have fifteen pose keypoints around which the skeleton structure is modeled.

At block 508, the processor models local parts of the objects in the first input object image based on the feature map and the pose keypoints to generate local representations. In various examples, a local representation may represent a pose part of an object. For example, a four-legged animal may have seven pose parts including four hind leg pose parts, two front leg pose parts, and a torso pose part. In some examples, modeling the local parts may include extracting the local representations from the global representation using regional average pooling.

At block 510, the processor fuses the global representation of the object with the local representations of the pose parts of the object to generate a fused representation of the object based on the first image. For example, the processor can train a deep neural network to perform a global transformation on aggregated local features using a triplet hard loss function. In some examples, the processor can aggregate local part features of the local representations using a concatenation of the local part features. In various examples, the processor can aggregating local part features of the local representations using a weighted summation of the local part features.

At block 512, the processor re-identifies the object with the identity in the second image based on the fused representation. In some examples, re-identifying the object may include receiving the second input object image at a trained deep neural network and outputting a re-identification of the object.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation.

Figure 6:
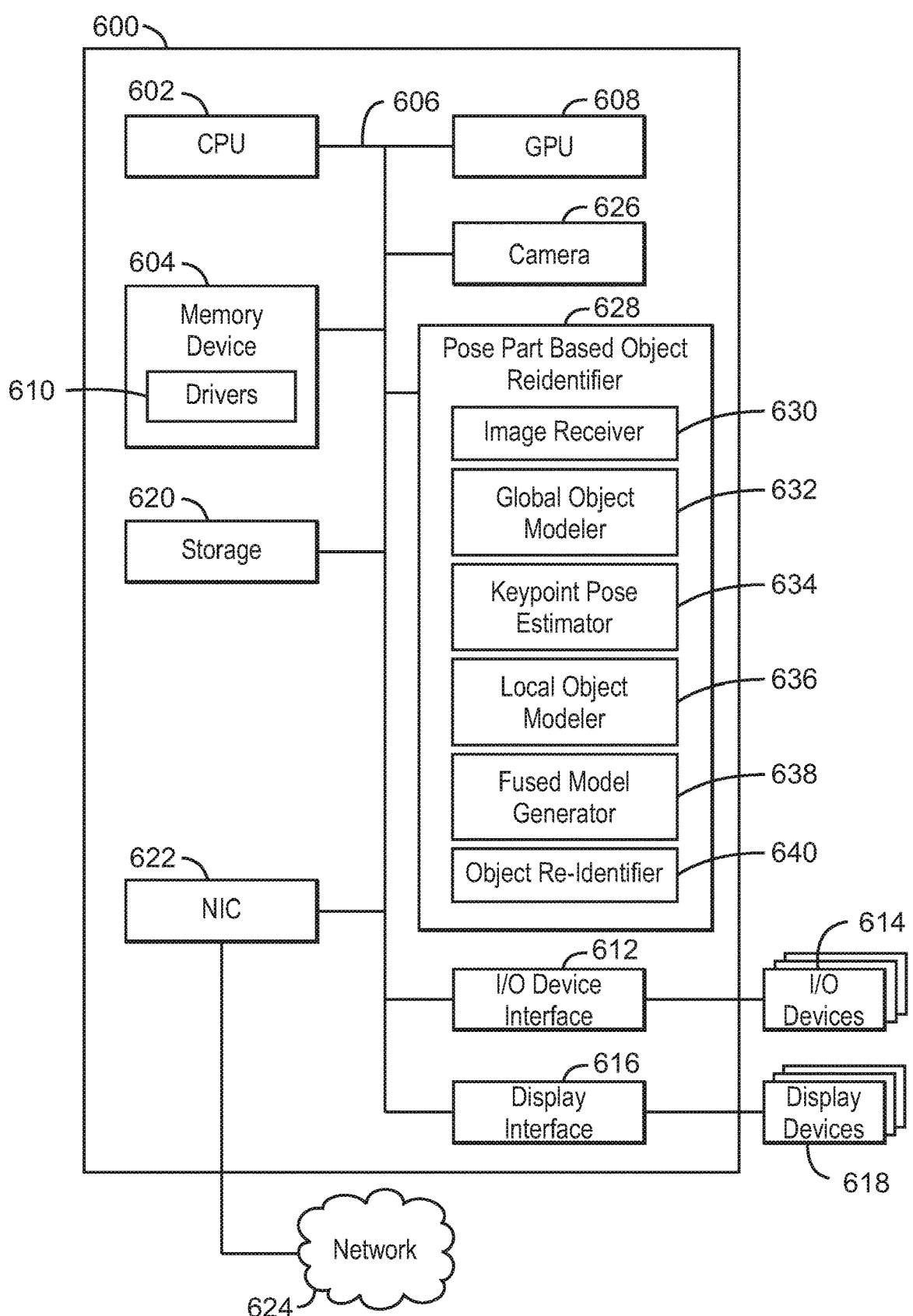
FIG. 6 is block diagram illustrating an example computing device that can re-identify objects using pose part based models.

Referring now to FIG. 6, a block diagram is shown illustrating an example computing device that can re-identify objects using pose part based models. The computing device 600 may be, for example, a laptop computer, desktop computer, tablet computer, mobile device, or wearable device, among others. In some examples, the computing device 600 may be a camera system. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for training multiple convolutional neural networks to perform sequence independent processing. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 626. For example, the camera 626 may include one or more imaging sensors. In some example, the camera 626 may include a processor to generate video frames.

The computing device 600 further includes a pose part based object re-identifier 628. For example, the pose part based object re-identifier 628 can be used to re-identifying an object with the same identity in images. The pose part based object re-identifier 628 can include an image receiver 630, global object modeler 632, and a keypoint pose estimator 634. In some examples, each of the components 630-640 of the pose part based object re-identifier 628 may be a microcontroller, embedded processor, or software module. The image receiver 630 can receive a first image and a second image of an object with an identity. The global object modeler 632 can generate the global representation, wherein the global representation includes a feature map. The keypoint pose estimator 634 can estimate pose keypoints in the first image to generate a skeleton structure of the object. The local object modeler 636 can generate the local representations of the pose parts based on a skeleton structure of the object and a feature map of the first image. For example, the local representations may include local part features. In some examples, the local object modeler 636 can extract the local representations from the global representation using regional average pooling. The fused model generator 638 can fuse a global representation of the object with local representations of pose parts of the object to generate a fused representation of the object based on the first image. In some examples, the fused representation may be star structure models. For example, a center of the star structure model may be a body part, while four limb parts may be star parts connected to the center of the star structure model. As one example, for a four legged animal, the body part may be the center, while other six parts may be star edges. In some examples, the fused model generator 638 can include a concatenating based local head to aggregate local part features using concatenation. In various examples, the fused model generator 638 can include a soft-attention based local head to aggregate local part features using a weighted summation of the local part features. In various examples, the fused model generator 638 may be a deep neural network trained using a fused-triplet loss function. The object re-identifier 640 can re-identify the object with the identity in the second image based on the fused representation. In some examples, the fused model generator 638 and object re-identifier 640 may be a deep neural network trained to generate the fused representations and re-identify the object.

For example, the deep neural network may be trained using the fused-triplet loss of the system of FIG. 2.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the image receiver 630, the global object modeler 632, the keypoint pose estimator 634, the local object modeler 636, the fused model generator 638, and the object re-identifier 640, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the pose part based object re-identifier 628 may be implemented with an application specific integrated circuit, in logic implemented in a processor, in logic implemented in a specialized graphics processing unit such as the GPU 608, or in any other device.

Figure 7:
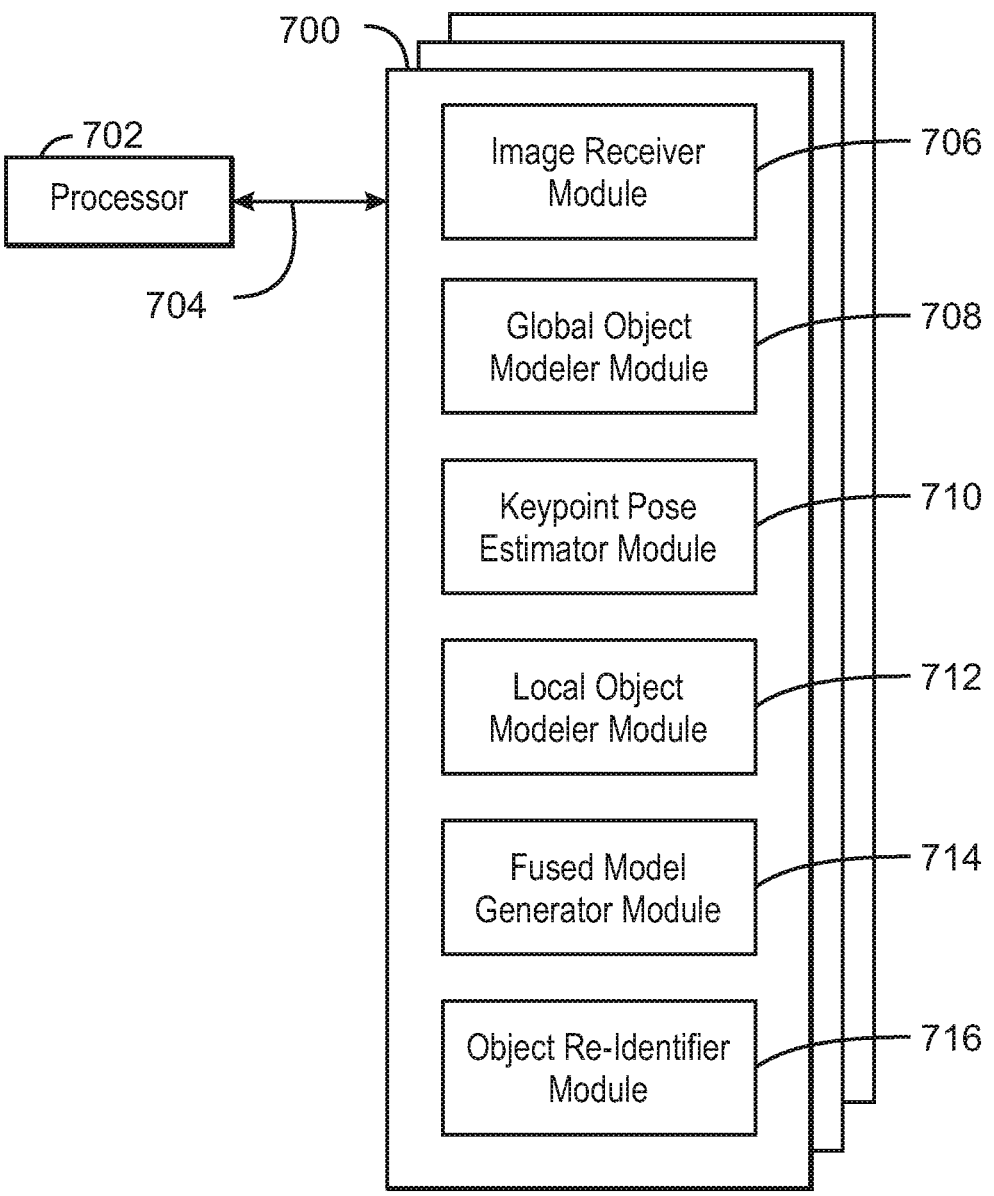
FIG. 7 is a block diagram showing computer readable media that store code for re-identifying objects using pose part based models.

FIG. 7 is a block diagram showing computer readable media 700 that store code for re-identifying objects using pose part based models. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an image receiver module 706 may be configured to receive a first input object image and a second input object image including an object with an identity. A global object modeler module 708 may be configured to globally model the object based on the first input object image to generate a global representation including a feature map. In some examples, the global object modeler module 708 may be configured to generate bounding boxes enclosing regions of an input object image corresponding to different pose parts of an object. A keypoint pose estimator module 710 may be configured to estimate pose keypoints of the object in the first input object image to generate a skeleton structure of the object. In some examples, the keypoint pose estimator module 710 may be configured to estimate the pose keypoints using a number of pose keypoints based on a category of the object. A local object modeler module 712 may be configured to model local parts of the object in the first input object image based on the feature map and the pose keypoints to generate local representations. For example, the local object modeler module 712 may be configured to extract the local representations from the global representation using regional average pooling. A fused model generator module 714 may be configured to fuse the global representation of the object with the local representations of the pose parts of the object to generate a fused representation of the object based on the first input object image. In some examples, the fused model generator module 714 may be configured to aggregate local part features of the local representations using a concatenation of the local part features. In various examples, the fused model generator module 714 may be configured to aggregate local part features of the local representations using a weighted summation of the local part features. An object re-identifier module 716 may be configured to re-identify the object with the identity in the second input object image based on the fused representation. In some examples, object re-identifier module 716 may be configured to receive the second input object image and output a re-identification of the object. For example, the object re-identifier module 716 may include a trained deep neural network.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation. For example, the computer readable media 700 may include a trainer module (not shown) may be configured to train a deep neural network to perform a global transformation on aggregated local features using a triplet hard loss function. In various examples, the trainer module may be configured to individually train a plurality of deep neural networks to globally model the object, estimate the pose keypoints, model the local parts of the object, and fuse the global representation of the object with the local representations of the object. In some examples, the trainer module may be configured to simultaneously train an integrated deep neural network to globally model the object, estimate the pose keypoints, model the local parts of the object, and fuse the global representation of the object with the local representations of the object.

EXAMPLES

Example 1 is an apparatus for re-identifying objects in images. The apparatus includes an image receiver to receive a first image and a second image of an object with an identity. The apparatus also includes a fused model generator to fuse a global representation of the object with local representations of pose parts of the object to generate a fused representation of the object based on the first image. The apparatus further includes an object re-identifier to re-identify the object with the identity in the second image based on the fused representation.

Example 2 includes the apparatus of example 1, including or excluding optional features. In this example, the apparatus includes a global object modeler to generate the global representation, wherein the global representation includes a feature map.

Example 3 includes the apparatus of any one of examples 1 to 2, including or excluding optional features. In this example, the apparatus includes a keypoint pose estimator to estimate pose keypoints in the first image to generate a skeleton structure of the object.

Example 4 includes the apparatus of any one of examples 1 to 3, including or excluding optional features. In this example, the apparatus includes a local object modeler to generate the local representations of the pose parts based on a skeleton structure of the object and a feature map of the first image, wherein the local representations include local part features.

Example 5 includes the apparatus of any one of examples 1 to 4, including or excluding optional features. In this example, the local representations include star structure models.

Example 6 includes the apparatus of any one of examples 1 to 5, including or excluding optional features. In this example, the apparatus includes a concatenating based local head to aggregate local part features using concatenation.

Example 7 includes the apparatus of any one of examples 1 to 6, including or excluding optional features. In this example, the apparatus includes a soft-attention based local head to aggregate local part features using a weighted summation of the local part features.

Example 8 includes the apparatus of any one of examples 1 to 7, including or excluding optional features. In this example, the apparatus includes a local object modeler to extract the local representations from the global representation using regional average pooling.

Example 9 includes the apparatus of any one of examples 1 to 8, including or excluding optional features. In this example, the apparatus includes wherein the fused representation generator includes a deep neural network trained using a fused-triplet loss function.

Example 10 includes the apparatus of any one of examples 1 to 9, including or excluding optional features. In this example, the apparatus includes a deep neural network trained to generate the fused representations and re-identify the object.

Example 11 is a method for re-identifying objects in images. The method includes receiving, via a processor, a first input object image and a second input object image including an object with an identity. The method also includes globally modeling, via the processor, the object based on the first input object image to generate a global representation including a feature map. The method further includes estimating, via the processor, pose keypoints of the object in the first input object image to generate a skeleton structure of the object. The method also includes modeling, via the processor, local parts of the object in the first input object image based on the feature map and the pose keypoints to generate local representations. The method further includes fusing, via the processor, the global representation of the object with the local representations of the pose parts of the object to generate a fused representation of the object based on the first input object image. The method also further includes re-identifying, via the processor, the object with the identity in the second input object image based on the fused representation.

Example 12 includes the method of example 11, including or excluding optional features. In this example, the method includes aggregating local part features of the local representations using a concatenation of the local part features.

Example 13 includes the method of any one of examples 11 to 12, including or excluding optional features. In this example, the method includes aggregating local part features of the local representations using a weighted summation of the local part features.

Example 14 includes the method of any one of examples 11 to 13, including or excluding optional features. In this example, modeling the local parts includes extracting the local representations from the global representation using regional average pooling.

Example 15 includes the method of any one of examples 11 to 14, including or excluding optional features. In this example, re-identifying the object includes receiving the second input object image at a trained deep neural network and outputting a re-identification of the object.

Example 16 includes the method of any one of examples 11 to 15, including or excluding optional features. In this example, globally modeling the object includes generating bounding boxes enclosing regions of an input object image corresponding to different pose parts of an object.

Example 17 includes the method of any one of examples 11 to 16, including or excluding optional features. In this example, estimating the pose keypoints includes estimating the pose keypoints using a number of pose keypoints based on a category of the object.

Example 18 includes the method of any one of examples 11 to 17, including or excluding optional features. In this example, fusing the global representation with the local representations includes training a deep neural network to perform a global transformation on aggregated local features using a triplet hard loss function.

Example 19 includes the method of any one of examples 11 to 18, including or excluding optional features. In this example, the method includes individually training a plurality of deep neural networks to globally model the object, estimate the pose keypoints, model the local parts of the object, and fuse the global representation of the object with the local representations of the object.

Example 20 includes the method of any one of examples 11 to 19, including or excluding optional features. In this example, the method includes simultaneously training an integrated deep neural network to globally model the object, estimate the pose keypoints, model the local parts of the object, and fuse the global representation of the object with the local representations of the object.

Example 21 is at least one computer readable medium for re-identifying objects in images having instructions stored therein that direct the processor to receive a first input object image and a second input object image including an object with an identity. The computer-readable medium also includes instructions that direct the processor to globally model the object based on the first input object image to generate a global representation including a feature map. The computer-readable medium further includes instructions that direct the processor to estimate pose keypoints of the object in the first input object image to generate a skeleton structure of the object; model local parts of the object in the first input object image based on the feature map and the pose keypoints to generate local representations. The computer-readable medium also further includes instructions that direct the processor to fuse the global representation of the object with the local representations of the pose parts of the object to generate a fused representation of the object based on the first input object image. The computer-readable medium also includes instructions that direct the processor to and re-identify the object with the identity in the second input object image based on the fused representation.

Example 22 includes the computer-readable medium of example 21, including or excluding optional features. In this example, the computer-readable medium includes instructions to cause the processor to aggregate local part features of the local representations using a concatenation of the local part features.

Example 23 includes the computer-readable medium of any one of examples 21 to 22, including or excluding optional features. In this example, the computer-readable medium includes instructions to cause the processor to aggregate local part features of the local representations using a weighted summation of the local part features.

Example 24 includes the computer-readable medium of any one of examples 21 to 23, including or excluding optional features. In this example, the computer-readable medium includes instructions to cause the processor to extract the local representations from the global representation using regional average pooling.

Example 25 includes the computer-readable medium of any one of examples 21 to 24, including or excluding optional features. In this example, the computer-readable medium includes instructions to cause the processor to receive the second input object image at a trained deep neural network and output a re-identification of the object.

Example 26 includes the computer-readable medium of any one of examples 21 to 25, including or excluding optional features. In this example, the computer-readable medium includes instructions to generate bounding boxes enclosing regions of an input object image corresponding to different pose parts of an object.

Example 27 includes the computer-readable medium of any one of examples 21 to 26, including or excluding optional features. In this example, the computer-readable medium includes instructions to estimate the pose keypoints using a number of pose keypoints based on a category of the object.

Example 28 includes the computer-readable medium of any one of examples 21 to 27, including or excluding optional features. In this example, the computer-readable medium includes instructions to train a deep neural network to perform a global transformation on aggregated local features using a triplet hard loss function.

Example 29 includes the computer-readable medium of any one of examples 21 to 28, including or excluding optional features. In this example, the computer-readable medium includes instructions to individually train a plurality of deep neural networks to globally model the object, estimate the pose keypoints, model the local parts of the object, and fuse the global representation of the object with the local representations of the object.

Example 30 includes the computer-readable medium of any one of examples 21 to 29, including or excluding optional features. In this example, the computer-readable medium includes instructions to simultaneously train an integrated deep neural network to globally model the object, estimate the pose keypoints, model the local parts of the object, and fuse the global representation of the object with the local representations of the object.

Example 31 is a system for re-identifying objects in images. The system includes an image receiver to receive a first image and a second image of an object with an identity. The system also includes a fused model generator to fuse a global representation of the object with local representations of pose parts of the object to generate a fused representation of the object based on the first image. The system further includes an object re-identifier to re-identify the object with the identity in the second image based on the fused representation.

Example 32 includes the system of example 31, including or excluding optional features. In this example, the system includes a global object modeler to generate the global representation, wherein the global representation includes a feature map.

Example 33 includes the system of any one of examples 31 to 32, including or excluding optional features. In this example, the system includes a keypoint pose estimator to estimate pose keypoints in the first image to generate a skeleton structure of the object.

Example 34 includes the system of any one of examples 31 to 33, including or excluding optional features. In this example, the system includes a local object modeler to generate the local representations of the pose parts based on a skeleton structure of the object and a feature map of the first image, wherein the local representations include local part features.

Example 35 includes the system of any one of examples 31 to 34, including or excluding optional features. In this example, the local representations include star structure models.

Example 36 includes the system of any one of examples 31 to 35, including or excluding optional features. In this example, the system includes a concatenating based local head to aggregate local part features using concatenation.

Example 37 includes the system of any one of examples 31 to 36, including or excluding optional features. In this example, the system includes a soft-attention based local head to aggregate local part features using a weighted summation of the local part features.

Example 38 includes the system of any one of examples 31 to 37, including or excluding optional features. In this example, the system includes a local object modeler to extract the local representations from the global representation using regional average pooling.

Example 39 includes the system of any one of examples 31 to 38, including or excluding optional features. In this example, the system includes wherein the fused representation generator includes a deep neural network trained using a fused-triplet loss function.

Example 40 includes the system of any one of examples 31 to 39, including or excluding optional features. In this example, the system includes a deep neural network trained to generate the fused representations and re-identify the object.

Example 41 is a system for re-identifying objects in images. The system includes means for receiving a first image and a second image of an object with an identity. The system also includes means for fusing a global representation of the object with local representations of pose parts of the object to generate a fused representation of the object based on the first image. The system further includes means for re-identifying the object with the identity in the second image based on the fused representation.

Example 42 includes the system of example 41, including or excluding optional features. In this example, the system includes means for generating the global representation, wherein the global representation includes a feature map.

Example 43 includes the system of any one of examples 41 to 42, including or excluding optional features. In this example, the system includes means for estimating pose keypoints in the first image to generate a skeleton structure of the object.

Example 44 includes the system of any one of examples 41 to 43, including or excluding optional features. In this example, the system includes means for generating the local representations of the pose parts based on a skeleton structure of the object and a feature map of the first image, wherein the local representations include local part features.

Example 45 includes the system of any one of examples 41 to 44, including or excluding optional features. In this example, the local representations include star structure models.

Example 46 includes the system of any one of examples 41 to 45, including or excluding optional features. In this example, the system includes means for aggregating local part features using concatenation.

Example 47 includes the system of any one of examples 41 to 46, including or excluding optional features. In this example, the system includes means for aggregating local part features using a weighted summation of the local part features.

Example 48 includes the system of any one of examples 41 to 47, including or excluding optional features. In this example, the system includes means for extracting the local representations from the global representation using regional average pooling.

Example 49 includes the system of any one of examples 41 to 48, including or excluding optional features. In this example, the system includes wherein the means for fusing the global representation of the object with the local representations of pose parts of the object includes a deep neural network trained using a fused-triplet loss function.

Example 50 includes the system of any one of examples 41 to 49, including or excluding optional features. In this example, the system includes a deep neural network trained to generate the fused representations and re-identify the object.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
interface circuitry;
machine-readable instructions; and
at least one processor circuit to be programmed by the machine-readable instructions to:
generate one or more local representations of pose parts of an object based on a first image of the object and a feature map associated with a global representation of the object, the pose parts associated with a skeleton structure of the object in a pose in the first image, each local representation including local part features of the object associated with a respective pose part, the first image captured by a first camera;
aggregate the one or more local representations of the pose parts using a weighted summation of the local part features to generate aggregated local features;
generate a fused representation of the object based on the aggregated local features and the global representation of the object; and
re-identify the object in a second image based on the fused representation, the second image captured using a second camera different than the first camera.

2. The apparatus of claim 1, wherein one or more of the at least one processor circuit is to generate the global representation, the global representation including the feature map.

3. The apparatus of claim 1, wherein one or more of the at least one processor circuit is to estimate pose keypoints in the first image and generate the skeleton structure of the object based on the pose keypoints.

4. The apparatus of claim 1, wherein the local representations include star structure models.

5. The apparatus of claim 1, wherein one or more of the at least one processor circuit is to extract the local representations from the global representation using regional average pooling.

6. The apparatus of claim 1, wherein one or more of the at least one processor circuit is to execute a deep neural network trained using a fused-triplet loss function to re-identify the object.

7. The apparatus of claim 1, wherein one or more of the at least one processor circuit is to execute a deep neural network to generate the fused representation and re-identify the object.

8. The apparatus of claim 1, wherein an identity of the object is defined by an attribute of the object in the first image.

9. The apparatus of claim 1, wherein one or more of the at least one processor circuit is to:
output a weight sum vector based on the weighted summation; and
execute a neural network to generate an identity loss vector from the weighted sum vector.

10. A method comprising:
globally modeling, by at least one processor circuit programmed by at least one instruction, an object based on a first input object image to generate a global representation of the object, the global representation including a feature map, the first input object image captured by a first camera;
estimating, by one or more of the at least one processor circuit, pose keypoints of the object in the first input object image;
generating, by one or more of the at least one processor circuit, a skeleton structure of the object based on the pose keypoints;
modeling, by one or more of the at least one processor circuit, local parts of the object in the first input object image based on the feature map and the skeleton structure to generate one or more local representations of pose parts of the object, the pose parts associated with the skeleton structure of the object in a pose in the first input object image, each local representation including local part features of the object associated with a respective pose part;

aggregating, by one or more of the at least one processor circuit, the one or more local representations of the pose parts using a weighted summation of the local part features to generate aggregated local features;

generating, by one or more of the at least one processor circuit, a fused representation of the object based on the aggregated local features and the global representation of the object; and re-identifying, by one or more of the at least one processor circuit, the object in a second input object image based on the fused representation, the second input object image captured using a second camera different than the first camera.

11. The method of claim 10, wherein modeling the local parts includes extracting the local representations from the global representation using regional average pooling.

12. The method of claim 10, wherein re-identifying the object includes executing a deep neural network for the second input object image, the deep neural network to output a re-identification of the object.

13. The method of claim 10, wherein globally modeling the object includes generating bounding boxes enclosing regions of a first input object image corresponding to different pose parts of the object.

14. The method of claim 10, wherein estimating the pose keypoints includes estimating the pose keypoints using a number of pose keypoints based on a category of the object.

15. The method of claim 14, further including training one or more deep neural networks to globally model the object, estimate the pose keypoints, model the local parts of the object, and fuse the global representation of the object with the local representations of the object.

16. The method of claim 10, wherein fusing the global representation with the local representations includes executing a deep neural network to perform a global transformation on the aggregated local features using a triplet hard loss function.

17. The method of claim 10, further including:

outputting a weight sum vector based on the weighted summation; and executing a neural network to generate an identity loss vector from the weighted sum vector.

18. A system comprising:

means for generating one or more local representations of pose parts of an object based on a first image of the object and a feature map associated with a global representation of the object, the pose parts associated with a skeleton structure of the object in a pose in the first image, each local representation including local part features of the object associated with a respective pose part, the first image captured by a first camera;

means for fusing to generate a fused representation of the object, the means for fusing to:

aggregate the one or more local representations of the pose parts using a weighted summation of the local part features to generate aggregated local features; and generate a fused representation of the object based on the aggregated local features and the global representation of the object; and means for re-identifying the object in a second image based on the fused representation, the second image captured using a second camera different than the first camera.

19. The system of claim 18, further including means for generating the global representation, the global representation including the feature map.

20. The system of claim 18, further including means for estimating pose keypoints in the first image to generate the skeleton structure of the object.

21. The system of claim 18, wherein the local representations include star structure models.

22. The system of claim 18, wherein the means for fusing is to:

output a weight sum vector based on the weighted summation; and execute a neural network to generate an identity loss vector from the weighted sum vector.

*    *    *    *    *